Nov. 10, 1970  J. A. KALLEVIG ET AL  3,539,793

SUPERVISORY APPARATUS

Filed Oct. 14, 1968

INVENTORS
JOHN A. KALLEVIG
NEIL C. SHER
BY
ATTORNEY

United States Patent Office 3,539,793
Patented Nov. 10, 1970

3,539,793
SUPERVISORY APPARATUS
John A. Kallevig, Shoreview, and Neil C. Sher, St. Paul, Minn., assignors to Honeywell Inc., Minneapolis, Minn., a corporation of Delaware
Filed Oct. 14, 1968, Ser. No. 767,259
Int. Cl. G06c 11/02
U.S. Cl. 235—201
3 Claims

ABSTRACT OF THE DISCLOSURE

Fluid apparatus for giving a first positive indication when working pressure exists in a fluid line, and a second positive indication when the working pressure does not exist in the line. The invention resides in the interconnection of known indicators to accomplish the new result.

BACKGROUND OF THE INVENTION

In the field of fluidics, a number of indicators have been developed for making apparent to an observer the state of a fluid system. Since the fluids are often invisible gases or transparent liquids, some way of determining the presence or absence of fluid under pressure in a particular portion of the system is necessary. One such indicator is disclosed in Sher et al. Pat. 3,357,638.

Indicators of this sort give a positive indication when exposed to a fluid signal of a first sense, but have the disadvantage that if the fluid signal reverses, the most they can do is remove the positive signal. The absence of a signal is not a satisfactory indication, since it can be due to system failure as well as to the presumptive system operation inferred from the lack of a signal.

SUMMARY OF THE INVENTION

The object of the present invention is to provide a fluid indicator arrangement which gives a positive indication for each of two opposite fluid conditions. A pair of indicators of known construction are interconnected in a novel fashion to accomplish this, and two alternative embodiments of the invention are disclosed.

Various objects, advantages and features of novelty which characterize our invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which we have illustrated and described certain preferred embodiments of our invention.

DESCRIPTION OF THE PREFERRED EMBODIMENTS

Figure 1:
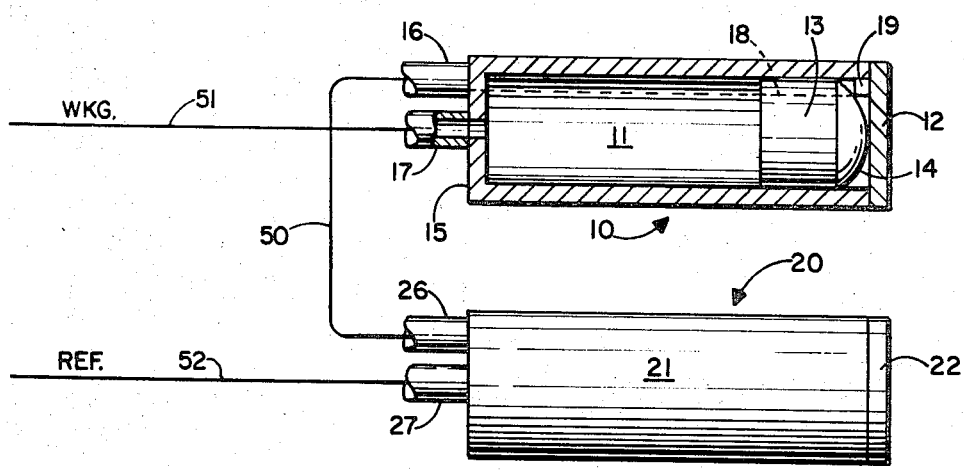
FIG. 1 is a showing of one embodiment of the invention, partly in section for illustrative purposes.

Referring first to FIG. 1, there are shown a pair of like fluid indicators 10 and 20, the former being shown partly in section. Indicator 10 comprises a cylindrical chamber 11 with a transparent window or end cap 12. A piston 13 is free to move in chamber 11, and the front end of piston 13, that nearest window 12, may be slightly convex if desired, and is brightly painted or given some other appropriate surface treatment so that it is clearly visible through the window when positioned adjacent thereto.

At the rear end 15 of chamber 11 there are shown a pair of connections 16 and 17 to the interior of the chamber. Connection 16 extends through a passage 18 independent of chamber 11 which opens into the chamber at a point 19 near window 12. Connection 17 extends directly into the chamber to the rear of piston 13. Elements in indicator 20 are given similar numbers in the series from 20 to 29.

Connection 16 of indicator 10 is joined by a conduit 50 to connection 26 of indicator 21. Connection 17 of indicator 10 is joined by a conduit 51 to a source of fluid at a working pressure. Connection 27 of indicator 20 is connected by a conduit 52 to a source of fluid at a reference pressure which is less than the working pressure.

In this arrangement, piston 13 of indicator 10 is adjacent to window 12, to give a positive indication, when the working pressure is present, and the piston of indicator 20 is at the connector end of indicator 21 and is hence not visible. If the working pressure falls below the reference pressure, the piston of indicator 10 retracts out of visible position and the piston of indicator 20 approaches window 22 to give a positive indication.

Figure 2:
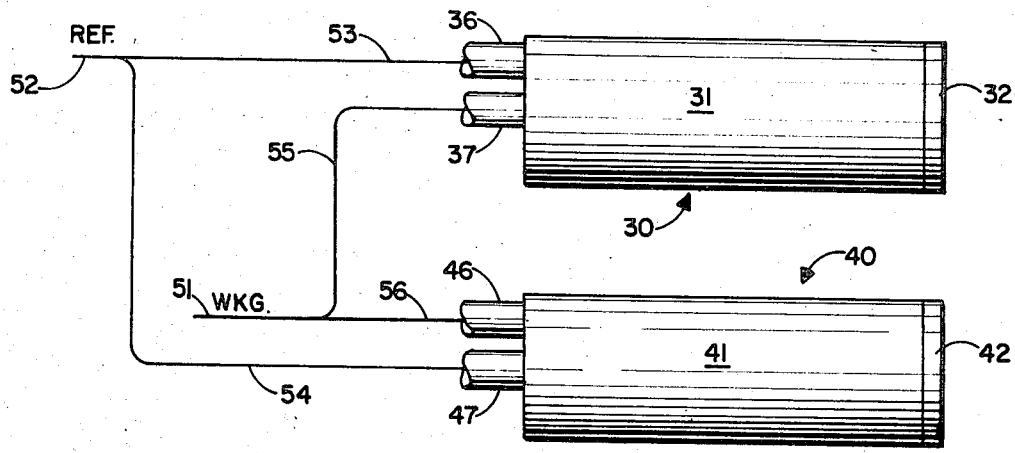
FIG. 2 is a showing of a second embodiment of the invention.

Turning now to FIG. 2, the second embodiment of this invention is shown to comprise a first indicator 30 having connections 36 and 37 and a second indicator 40 having connections 46 and 47; these indicators are identical in structure with indicator 10 of FIG. 1. Connections 36 and 47 are joined to reference pressure conduit 52 by conduits 53 and 54 respectively and connections 37 and 46 are joined to reference pressure conduit 51 by conduits 55 and 56 also respectively.

In this arrangement, as in FIG. 1, the piston of indicator 30 alone is visible when the working pressure is present and the piston of indicator 40 alone is visible if the working pressure fails.

Numerous objects and advantages of our invention have been set forth in the foregoing description, together with details of the structure and function of the invention, and the novel features thereof are pointed out in the appended claims. The disclosure, however, is illustrative only, and may make changes in detail, especially in matters of shape, size, and arrangement of parts, within the principle of the invention, to the fullest extent indicated by the broad general meaning of the terms in which the appended claims are expressed.

We claim as our invention:
1. In combination:
   first and second fluid indicating devices each having first and second fluid input connections, each said device giving a positive indication when the fluid pressure supplied to said first connection is greater than that supplied to said second connection;
   a working source of fluid pressure;
   a reference source of fluid pressure; and
   conduit means by which said devices and said sources are interconnected to give simultaneous fluid flow through said indicators in opposite directions, so that when the working pressure exceeds the reference pressure said first indicator gives a positive indication, and when the reference pressure exceeds the working pressure said second indicator alone gives a positive indication.

2. Apparatus according to claim 1 in which the last named means comprises means connecting the working pressure source to the first input connection of said first device;

means connecting the reference source to the first input connection of said second device; and means connecting the second input connection of said first device to the second input connection of said second device.

3. Apparatus according to claim 1 in which the last named means comprises means connecting the working pressure source to the first input connection of said first device and the second input connection of the second device, and means connecting the reference source to the first input connection of the second device and the second input connection to the first device.

References Cited

UNITED STATES PATENTS

| | | | |
|---|---|---|---|
| 3,070,295 | 12/1962 | Glattli | 235—201 |
| 3,362,633 | 1/1968 | Freeman | 235—201 |

OTHER REFERENCES

Glattli, H. H.: "Three Terminal Ball Element," IBM Technical Disclosure Bulletin, vol. 6, No. 2, July 1963, p. 28.

RICHARD B. WILKINSON, Primary Examiner

L. R. FRANKLIN, Assistant Examiner

U.S. Cl. X.R.

116—70